No. 719,544. PATENTED FEB. 3, 1903.
P. A. WHITNEY.
ANIMAL TRAP.
APPLICATION FILED NOV. 28, 1902.
NO MODEL.

Witnesses

Inventor
Pardon A. Whitney
Attorneys

United States Patent Office.

PARDON A. WHITNEY, OF SOUTHINGTON, CONNECTICUT.

ANIMAL-TRAP.

SPECIFICATION forming part of Letters Patent No. 719,544, dated February 3, 1903.

Application filed November 28, 1902. Serial No. 133,149. (No model.)

*To all whom it may concern:*

Be it known that I, PARDON A. WHITNEY, a citizen of the United States of America, residing at Southington, in the county of Hartford and State of Connecticut, have invented certain new and useful Improvements in Animal-Traps, of which the following is a specification.

The object of my invention is to provide a trap having features of novelty and advantage.

Figure 1:
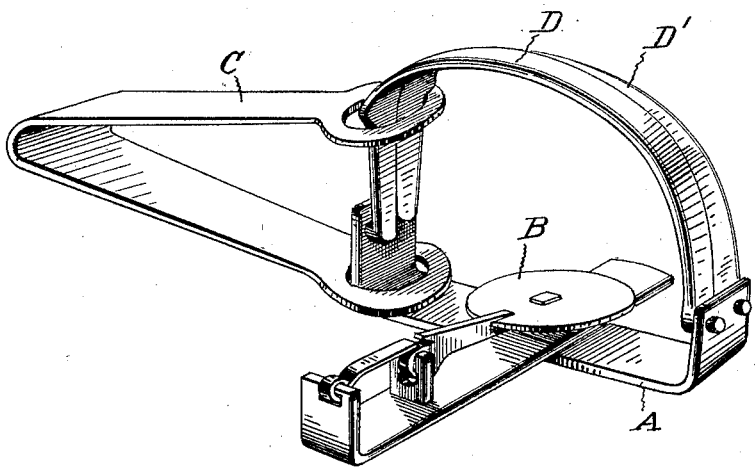
Figure 2:
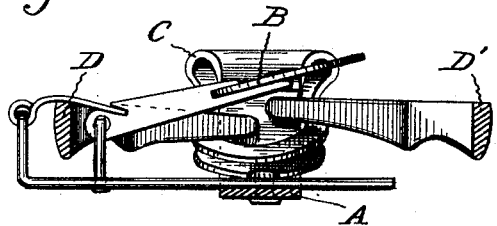

In the drawings, Figure 1 is a perspective view of the trap with the jaws closed. Fig. 2 is a sectional end view with the jaws open.

I have noticed in traps of this class as they are built at the present time that when they are opened the free jaw—that is to say, the one which is not held down by the latch—is invariably thrown up by the spring, so that it lies very much higher than the confined jaw. This makes it very much more difficult to conceal the traps than if the jaws were substantially in the same plane and in their lowest position, and another disadvantage is the fact that this jaw being raised is in the way of game and very often acts as an alarm to warn them away. There are other decided disadvantages in such an arrangement—as, for instance, the fact that when the trap is sprung one jaw has farther to move than the other, and they do not, therefore, come together at the same time and with the same quickness as they would otherwise. Having these objections in mind, I have devised a means for overcoming these difficulties and for causing the jaws to rest in their lowest positions and in approximately the same plane one with the other. United States Patent issued to me August 5, 1902, and numbered 706,470, discloses one way of accomplishing this object.

My present invention, while having the same object as the above-mentioned patent, discloses a method of accomplishing this object which has certain features of novelty.

In general construction the trap is like the well-known traps of this class, having the base A, the trip B, the spring C, and the jaws D D'. It will be seen on examination of Fig. 1 of the drawings that the jaw D, which coöperates with the trip B to hold the trap open, is pivoted to the spring end of the base at a lower point than the jaw D'. Fig. 2 clearly illustrates the effect of pivoting the tripped jaw D at a lower point than the free jaw D', and it is seen that the jaws of the trap when it is set lie substantially in the same plane and in the lowest positions. This result is accomplished by bending the spring down on one side by the peculiar arrangement of the trip-jaw to such an extent that as the other side tips up slightly, as it will do, it will not bear against the free jaw with enough force to throw the free jaw out of the plane of the tripped jaw.

I claim as my invention—

1. In a trap of the class specified the combination with the base, the spring, and the latch, of jaws pivoted at each end in the base, one of said jaws being pivoted in a lower plane than the other jaw, substantially as described and for the purposes specified.

2. In a trap of the class specified the combination with the base, the spring, and the latch, of jaws pivoted in the base, one of said jaws being pivoted in a lower plane than the other at the spring end of the base.

3. In a trap of the class specified the combination with the base, the spring, and the latch, of jaws pivoted in the base, one of which is adapted to coöperate with the latch, said last-mentioned jaw being pivoted in a lower plane than the other jaw, substantially as described and for the purposes set forth.

In testimony whereof I affix my signature in presence of two witnesses.

PARDON A. WHITNEY.

Witnesses:
  H. E. HAET,
  D. I. KREIMENDAHL.